2,782,236
PRODUCTION OF AMINODIBORANES

George F. Huff, Pittsburgh, Pa., assignor to Callery Chemical Company, Pittsburgh, Pa., a corporation of Pennsylvania No Drawing. Application October 15, 1953,
Serial No. 386,399

7 Claims. (Cl. 260—583)

This invention relates to aminodiboranes, $R_2NB_2H_5$ where R may be an alkyl radical or hydrogen, or both, and the primary object of the invention is to provide a method of making such compounds that is simple, easily practiced, and does not require complicated or costly apparatus.

The invention is predicated largely upon my discovery that aminodiboranes may be produced readily from amine-borines by treatment of the borine with aprotonic acids of the Lewis type using molar proportions of 2 to 1, borine to acid. Under the Lewis concept, an acid is a substance that can accept a pair of electrons from another substance to form a chemical bond. That concept includes not only substances that are proton donors, such as hydrochloric acid, but also substances that are electron deficient but do not furnish protons, for instance boron trifluoride. Those substances donating protons are designated as protonic, while those that are merely electron deficient but do not donate protons are called aprotonic.

The amine-borines useful in the practice of the invention may be represented by the formula $R_2NH:BH_3$ where R may be an alkyl radical, preferably lower alkyl, or hydrogen, or both. Thus this empirical formula contemplates not only primary amine-borines, exemplified by $CH_3NH_2:BH_3$, and secondary amine-borines, exemplified by $(CH_3)_2NH:BH_3$, but also diborane diammoniate $(B_2H_6.2NH_3)$ which may be represented as $NH_3:BH_3$ and thus as a borine of ammonia.

A variety of the aforesaid Lewis type aprotonic acids are known and available, examples being silicon tetrachloride $(SiCl_4)$, phosphorus pentoxide $(P_2O_5)$, sulfur dioxide $(SO_2)$, and the oxychlorides of sulfur such as thionyl chloride $(SOCl_2)$ and sulfuryl chloride $(SO_2Cl_2)$. However, for many purposes it is preferred to use boron trifluoride $(BF_3)$ as the Lewis type acid in the practice of this invention.

The reaction may be represented as follows:

$$2R_2NH:BH_3 + BF_3 \rightarrow R_2NB_2H_5 + R_2NHBF_3 + H_2$$

where, as indicated above, R may be alkyl or hydrogen, or both.

Experience has shown that only Lewis type acids are operative for the purposes of this invention, and that protonic acids, such as hydrochloric acid (HCl), can not be used because they attack the boron-hydrogen bonds in the borine radical. This action may be represented as follows, using the same notation as above:

$$2R_2NH:BH_3 + HCl \rightarrow$$
$$1/2 R_2NHBHCl_2 + 3/2 R_2NBH_2 + 5/2 H_2$$

The amine borines may be produced by various known means, as by reacting diborane $(B_2H_6)$ and an amine at low temperatures. Dimethyl amine borine

$$[(CH_3)_2NH:BH_3]$$

may be produced likewise by electrolyzing a solution of an ionic borohydride, such as sodium borohydride $(NaBH_4)$, in dimethyl amine $(Me_2NH)$ using an inert anode and a mercury cathode.

The reaction conditions are not critical but depend on the particular amine borine and non-protonic Lewis acid, due regard being had to the volatility of the reactants and to avoid temperatures that would cause decomposition of the desired aminodiborane, or its conversion into other compounds. For most purposes, however, it is preferred to conduct the reaction under elevated temperature and pressure conditions, as exemplified by the following examples:

*Example 1.*—Dimethylamine-borine and $BF_3$ in 2:1 mol ratio were sealed in a Pyrex tube and held at 100° C. for 12 hours. The tube was then opened and the dimethylaminodiborane produced, a liquid at atmospheric temperature and atmospheric pressure, was separated from the other reaction products in an 80 percent yield. The reaction was as follows:

$$2(CH_3)_2NH:BH_3 + BF_3 \rightarrow$$
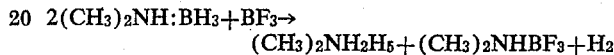
$$(CH_3)_2NH_2H_5 + (CH_3)_2NHBF_3 + H_2$$

*Example 2.*—In this instance the conditions were the same as in Example 1 except that aluminum chloride $(AlCl_3)$ was substituted for the $BF_3$, and a 20 percent yield of dimethyl aminodiborane was recovered from the reaction products. Greater care in excluding moisture would, it is believed, have raised the yield to that of Example 1.

*Example 3.*—As showing the inability to accomplish this result with protonic acids, the same proportions of dimethylamine-borine and hydrogen chloride were treated in the same way. When the tube was opened there was recovered 2½ mols of hydrogen $(H_2)$ per mol of hydrogen chloride together with a white solid having a camphor-like odor. No dimethyl aminodiborane was found. This indicates that the reaction was as follows:

$$2(CH_3)_2NH:BH_3 + HCl \rightarrow$$
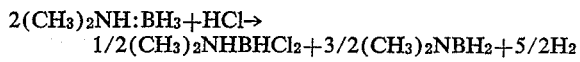
$$1/2(CH_3)_2NHBHCl_2 + 3/2(CH_3)_2NBH_2 + 5/2H_2$$

rather than the reaction given above as representative of the present invention.

The aminodiboranes offer utility as high energy fuels and as hydrocarbon fuel additives for such purposes as preventing deposition upon piston and cylinder walls of lead from leaded gasolines, and to maintain the cetane rating of diesel fuels.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. That method of making an aminodiborane comprising reacting an amine-borine and an aprotonic acid of the Lewis type in proportions of 2 mols of the former to 1 of the latter, and then separating and recovering from the reaction products the aminodiborane thus formed.

2. That method of making an aminodiborane comprising reacting an amine-borine of the formula $R_2NH:BH_3$, where R is a member of the group consisting of alkyl radical and hydrogen, and an aprotonic acid of the Lewis type in proportions of 2 mols of the former to 1 of the latter, and then separating and recovering from the reaction products the aminodiborane thus formed.

3. That method of making an aminodiborane comprising reacting, under elevated temperature and pressure, an amine-borine of the formula $R_2NH:BH_3$ where R is a member of the group consisting of lower alkyl radical or hydrogen, and an aprotonic acid of the Lewis type in proportions of 2 mols of the former to 1 of the latter, and then separating and recovering from the reaction products the aminodiborane thus formed.

4. A method according to claim 3, said acid being $BF_3$.

5. A method according to claim 3, said acid being $AlCl_3$.

6. That method of making dimethylaminodiborane comprising reacting, under elevated temperature and pressure, a dimethylamine-borine and an aprotonic acid of the Lewis type in proportions of 2 mols of the former to 1 of the latter, and then separating and recovering from the reaction products the dimethylaminodiborane thus formed.

7. A method according to claim 6, said acid being a halide of the group consisting of $BF_3$ and $AlCl_3$, and the reaction being conducted under autogenous pressure at about 100° C.

References Cited in the file of this patent

Burg et al.: J. Am. Chem. Soc., vol. 71, pp. 3451–5 (1949).

Schlesinger et al.: Chem. Reviews, vol. 31, pp. 1–41, particularly 5 (1942).

Chem. Abst., vol. 41, p. 5919 (1945).